(12) United States Patent
Rao et al.

(10) Patent No.: US 8,909,278 B2
(45) Date of Patent: Dec. 9, 2014

(54) ADJUSTING WIRELESS SIGNAL TRANSMISSION POWER

(75) Inventors: Prashanth Rao, Lowell, MA (US); Satish Ananthaiyer, Tewksbury, MA (US); Pierre A. Humblet, Cambridge, MA (US); Vedat Eyuboglu, Concord, MA (US)

(73) Assignee: Airvana LP, Chelmsford, MA (US)

( * ) Notice: Subject to any disclaimer, the term of this patent is extended or adjusted under 35 U.S.C. 154(b) by 876 days.

(21) Appl. No.: 11/963,574

(22) Filed: Dec. 21, 2007

(65) Prior Publication Data

US 2009/0163238 A1   Jun. 25, 2009

(51) Int. Cl.
| | |
|---|---|
| H04B 17/00 | (2006.01) |
| H04B 7/00 | (2006.01) |
| H04M 1/00 | (2006.01) |
| H04L 12/26 | (2006.01) |
| H04W 4/00 | (2009.01) |
| H04B 1/00 | (2006.01) |
| H04B 1/38 | (2006.01) |
| H04L 5/16 | (2006.01) |
| H04K 1/10 | (2006.01) |
| H04L 27/28 | (2006.01) |
| H04W 52/24 | (2009.01) |
| H04W 52/22 | (2009.01) |
| H04W 52/28 | (2009.01) |

(52) U.S. Cl.
CPC .......... *H04W 52/241* (2013.01); *H04W 52/225* (2013.01); *H04W 52/244* (2013.01); *H04W 52/287* (2013.01)
USPC ..................... 455/522; 455/67.13; 455/562.1; 370/252; 370/331; 370/338; 375/140; 375/219; 375/260

(58) Field of Classification Search
CPC .... H04L 1/0003; H04B 7/0626; H05W 52/50
USPC ........ 455/13.4, 68, 69, 70, 84, 115, 125, 126, 455/127.1, 127.2, 134, 136, 137, 138, 343, 455/404.1, 404.2, 405, 418, 419, 420, 442, 455/447, 452.1, 452.2, 455, 456.1, 456.2, 455/515, 517, 522, 574; 370/203, 204, 208, 370/229, 230, 280, 244, 310, 311, 318, 319, 370/320, 321, 328, 329, 331, 332, 333, 334, 370/335, 336, 337, 342, 343, 347, 348, 350, 370/377, 394, 395.4, 473, 506; 375/141, 375/150, 260
See application file for complete search history.

(56) References Cited

U.S. PATENT DOCUMENTS

| | | |
|---|---|---|
| 6,711,144 B1 | 3/2004 | Kim et al. |
| 6,731,618 B1 | 5/2004 | Chung et al. |

(Continued)

FOREIGN PATENT DOCUMENTS

| | | |
|---|---|---|
| GB | 2452688 | 3/2009 |
| GB | 2468451 | 9/2010 |

(Continued)

OTHER PUBLICATIONS

Loa et al., RS Sleep Mode, Jan. 8, 2007, IEEE 5802.16j-07/066, pp. 1-15.*

(Continued)

*Primary Examiner* — Yuwen Pan
*Assistant Examiner* — Paul P Tran
(74) *Attorney, Agent, or Firm* — Fish & Richardson P.C.

(57) ABSTRACT

A home base station receives signal to interference and noise ratio data from at least one access terminal, determines whether a transmission power of the home base station should be adjusted based on the received signal to interference and noise ratio data, and then adaptively adjusts the transmission power of the home base station based on the received signal to interference and noise ratio data.

32 Claims, 7 Drawing Sheets

(56) References Cited

U.S. PATENT DOCUMENTS

| | | | |
|---|---|---|---|
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,558,356 B2 | 7/2009 | Pollman et al. | |
| 7,558,588 B2 | 7/2009 | To et al. | |
| 2002/0115459 A1* | 8/2002 | Chuang et al. | 455/522 |
| 2002/0191703 A1* | 12/2002 | Ling et al. | 375/267 |
| 2002/0196749 A1 | 12/2002 | Eyuboglu et al. | |
| 2003/0100311 A1 | 5/2003 | Chung et al. | |
| 2003/0100343 A1 | 5/2003 | Zourntos et al. | |
| 2003/0220103 A1* | 11/2003 | Kim et al. | 455/422.1 |
| 2004/0029320 A1* | 2/2004 | Chong et al. | 438/142 |
| 2004/0203992 A1 | 10/2004 | Yun | |
| 2005/0141467 A1* | 6/2005 | Pan et al. | 370/338 |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2005/0265289 A1 | 12/2005 | Krishnan | |
| 2006/0025136 A1 | 2/2006 | Fujita et al. | |
| 2006/0040696 A1* | 2/2006 | Lin | 455/522 |
| 2006/0067422 A1 | 3/2006 | Chung | |
| 2006/0067451 A1 | 3/2006 | Pollman et al. | |
| 2006/0094372 A1* | 5/2006 | Ahn et al. | 455/67.13 |
| 2006/0114836 A1* | 6/2006 | Pollin et al. | 370/252 |
| 2006/0126509 A1 | 6/2006 | Abi-Nassif et al. | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0220573 A1 | 9/2007 | Chiussi et al. | |
| 2007/0224936 A1* | 9/2007 | Desai | 455/41.2 |
| 2007/0230419 A1 | 10/2007 | Raman et al. | |
| 2007/0238442 A1 | 10/2007 | Mate et al. | |
| 2007/0238476 A1 | 10/2007 | Sharma et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0219214 A1* | 9/2008 | Chen et al. | 370/331 |
| 2008/0253550 A1 | 10/2008 | Ch'ng et al. | |
| 2008/0254792 A1 | 10/2008 | Ch'ng | |
| 2009/0034440 A1 | 2/2009 | Samar et al. | |
| 2009/0082020 A1 | 3/2009 | Ch'ng et al. | |
| 2009/0088155 A1 | 4/2009 | Kim | |
| 2009/0116445 A1 | 5/2009 | Samar et al. | |
| 2009/0135754 A1* | 5/2009 | Yavuz et al. | 370/311 |
| 2009/0154447 A1 | 6/2009 | Humblet | |
| 2009/0156165 A1 | 6/2009 | Raghothaman et al. | |
| 2009/0156195 A1 | 6/2009 | Humblet | |
| 2009/0156218 A1 | 6/2009 | Garg et al. | |
| 2009/0163202 A1 | 6/2009 | Humblet et al. | |
| 2009/0163216 A1 | 6/2009 | Hoang et al. | |
| 2009/0163238 A1 | 6/2009 | Rao et al. | |
| 2009/0164547 A1 | 6/2009 | Ch'ng et al. | |
| 2009/0168766 A1 | 7/2009 | Eyuboglu et al. | |
| 2009/0168788 A1 | 7/2009 | Den et al. | |
| 2009/0170440 A1 | 7/2009 | Eyuboglu et al. | |
| 2009/0170475 A1 | 7/2009 | Ch'Ng et al. | |
| 2009/0170520 A1 | 7/2009 | Jones | |
| 2009/0170547 A1 | 7/2009 | Raghothaman et al. | |
| 2009/0172169 A1 | 7/2009 | Ch'Ng et al. | |
| 2009/0172397 A1 | 7/2009 | Kim | |
| 2010/0029320 A1* | 2/2010 | Malladi et al. | 455/522 |

FOREIGN PATENT DOCUMENTS

| | | |
|---|---|---|
| WO | WO 2009/085938 | 7/2009 |
| WO | WO 2009/085938 | 12/2009 |

OTHER PUBLICATIONS

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

3rd Generation Partnership Project, Technical Specification Group Core Network and Terminals; Numbering, addressing and identification (Release 7), 3GPP TS 23.003 v7.4.0, Global System for Mobile Communications, Jun. 2007 (53 pages).

3rd Generation Partnership Project, Technical Specification Group Radio Access Network; User Equipment (UE) procedures in idle mode and procedures for cell reselection in connected mode (Release 7), 3GPP TS 25.304 v7.6.0, Universal Mobile Telecommunications Systems (UMTS), Jun. 2007 (43 pages) (revised version of 25.304 v7.2.0).

3rd Generation Partnership Project, Technical Specification Group Radio Access Network; Radio Resource Control (RRC); Protocol Specification (Release 7), 3GPP TS 25.331 v7.9.0, Universal Mobile Telecommunications Systems (UMTS), Jul. 2008 (1473 pages) (revised version of 25.331 v7.5.0).

International Search Report and Written Opinion mailed Oct. 23, 2009 in corresponding PCT application No. PCT/US2008/087405 (18 pages).

International Preliminary Report on Patentability mailed Jul. 1, 2010 in corresponding PCT application No. PCT/US2008/087405 (11 pages).

Examination Report from United Kingdom Application No. GB1010586.4 mailed Dec. 12, 2011 (3 pages).

Response to Examination Report from United Kingdom Application No. GB1010586.4 mailed May 1, 2012, filed Jun. 28, 2012 (5 pages).

Response to Examination Report from United Kingdom Application No. GB1010586.4 mailed Dec. 12, 2011, filed Apr. 13, 2012 (17 pages).

Examination Report from United Kingdom Application No. GB1010586.4 mailed May 1, 2012 (2 pages).

* cited by examiner

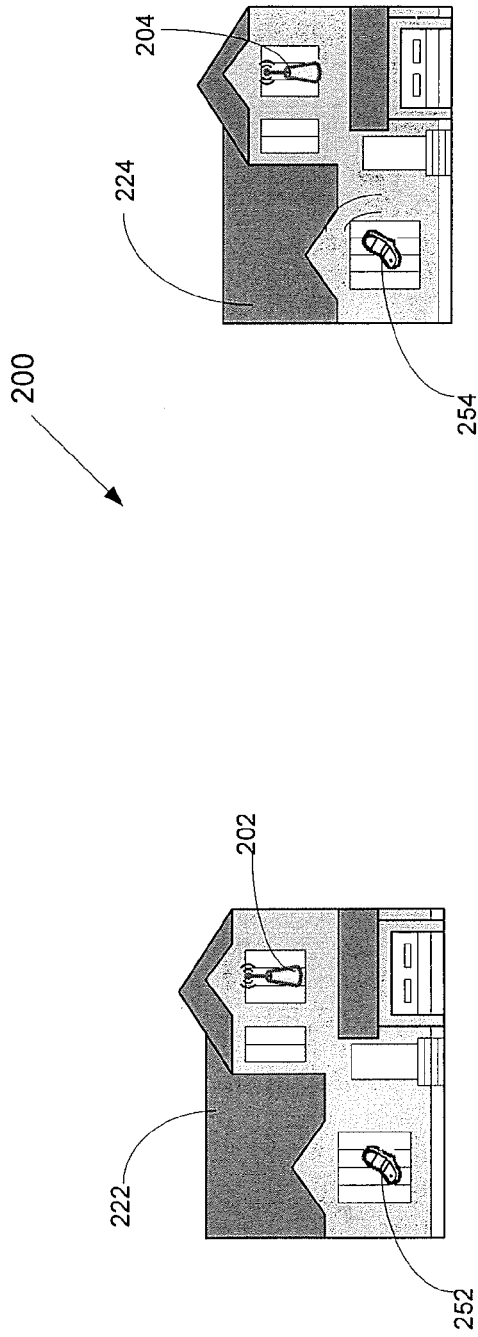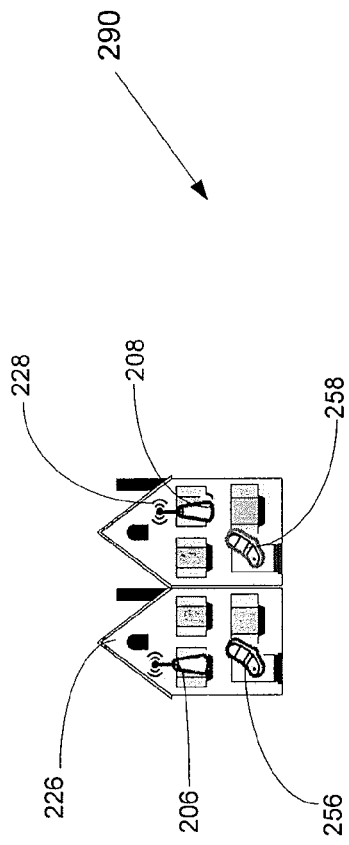
Fig. 2a
Fig. 2b

ADJUSTING WIRELESS SIGNAL TRANSMISSION POWER

BACKGROUND

This disclosure relates to adjusting wireless signal transmission power.

Wireless communications systems are designed to serve many access terminals (e.g., cellular telephones, laptops, PDAs, etc.) that may be distributed in a large geographic area. A large geographic area serviced by a wireless communication system is often divided into cells. A wireless tower located in a cell often serves hundreds of users.

Several standardized protocols have been adopted by the wireless communication industry. For example, the 1xRTT protocol has been standardized by the Telecommunication Industry Association (TIA) and is described in the TIA-2000.1 through TIA-2000.6 series of specifications, which are incorporated herein by reference.

Another protocol is the 1xEV-DO protocol, which has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference.

The UMTS and HSDPA protocols (W-CDMA) have been standardized by the Third Generation Partnership Project (3GPP). Specifications relevant to this disclosure include 3GPP TS 23.003 v7.4.0, 3rd Generation Partnership Project; Technical Specification Group Core Network and Terminals; Numbering, addressing and identification (Release 7); 3GPP TS 25.304 v7.2.0, 3rd Generation Partnership Project; Technical Specification Group Radio Access Network; User Equipment (UE) procedures in idle mode and procedures for cell reselection in connected mode (Release 7); and 3GPP TS 25.331 v7.5.0, 3rd Generation Partnership Project; Technical Specification Group Radio Access Network; Radio Resource Control (RRC); Protocol Specification (Release 7). The UMTS and HSDPA protocols are incorporated herein by reference.

SUMMARY

In general, a home base station receives signal to interference and noise ratio data from at least one access terminal, determines whether a transmission power of the home base station should be adjusted based on the received signal to interference and noise ratio data, and then adaptively adjusts the transmission power of the home base station based on the received signal to interference and noise ratio data. The transmission power may be beacon transmission power or service transmission power. In situations in which an active connection is absent on the home base station, the service transmission power is set to a quiescent power level. In scenarios in which an access terminal associated with the home base station is not provided services by a service carrier of the home base station, the service transmission power is turned off. The home base station increases the service transmission power from the quiescent power level when at least one access terminal becomes active and sets the service transmission power between a maximum power level and a minimum power level.

In one aspect, a home base station decides whether a transmission power of the home base station should be adjusted by building a histogram for the at least one access terminal based on the signal to interference and noise ratio data received, and calculating a probability distribution function for the at least one access terminal based on the histogram. The home base station then constructs a coverage failure probability function by computing a weighted sum of probability distribution functions of all access terminals, and from the weighted sum computing a coverage failure complementary cumulative distribution function. The weighting may be equal among access terminals or be dependent on profiles of access terminals, or activities of access terminals. The weighing may also be dependent on distances between the home base station and access terminals. In some implementations, a probability distribution function of an access terminal that is located outside the coverage area of the home base station is discounted in the weighted sum.

From the coverage failure probability function, the home base station derives a filtered coverage failure probability by averaging the coverage failure probability function over a period of time. The home base station then determines whether to adjust the transmission power based on the filtered coverage failure probability. The transmission power may be a service transmission power or a beacon transmission power. The transmission power may be adjusted upward or downward.

In one aspect, the signal to interference and noise ratio data are related to the beacon transmission power and are sent in along with the signal to interference and noise ratio data related to the service transmission power.

In another aspect, the signal to interference and noise ratio data are related to the service transmission power, and signal to interference and noise ratio data related to the beacon transmission power are derived from a first report of the signal to interference and noise ratio data related to the service transmission power when the at least one access terminal moves into the coverage area of the home base station.

Yet in another aspect, the signal to interference and noise ratio data are related to the service transmission power, and signal to interference and noise ratio data related to the beacon transmission power are derived from a first few reports of the signal to interference and noise ratio data related to the service transmission power when the at least one access terminal moves into the coverage area of the home base station.

In general, an apparatus comprising a home base station is configured to receive signal to interference and noise ratio data from at least one access terminal, determine whether a transmission power of the home base station should be adjusted based on the received signal to interference and noise ratio data, and adaptively adjust the transmission power of the home base station based on the received signal to interference and noise ratio data. The transmission power is a service transmission power or a beacon transmission power. The apparatus may comprise a normal operating mode and a quiescent power mode. During the normal operating mode, the home base station operates at a normal operating power level. During the quiescent power mode, the home base station operates at a quiescent power level. The home base station transitions between the normal operating mode and the quiescent power mode based on connection status of access terminals. The apparatus may comprise a third mode, a service carrier power off mode. During the service carrier power off mode, the service transmission power is turned off. The home base station switches out of the service carrier power off mode when at least one access terminal acknowledges a service redirection message sent from the home base station. The home base station switches into the service carrier power off mode when no access terminal is serviced by the home base station. The home base station transitions among the normal operating mode, the quiescent power mode, and the service carrier power off mode based on connection status of access terminals.

In one aspect, a computer readable medium stores instructions to cause a home base station to receive signal to interference and noise ratio data from at least one access terminal, determine whether a transmission power of the home base station should be adjusted based on the signal to interference and noise ratio data received, and adaptively adjust the transmission power of the home base station based on the signal to interference and noise ratio data received. The transmission power may be beacon transmission power or service transmission power. In some implementations, determining whether a transmission power of the home base station should be adjusted comprises (a) building a histogram for the at least one access terminal based on the signal to interference and noise ratio data received; (b) calculating a probability distribution function for the at least one access terminal based on the histogram; (c) constructing a coverage failure probability function by computing a weighted sum of probability distribution functions of all access terminals, and from the weighted sum computing a coverage failure complementary cumulative distribution function; (d) deriving a filtered coverage failure probability by averaging the coverage failure probability function over a period of time; and (e) determining whether to adjust the transmission power based on the filtered coverage failure probability.

In one aspect, the computer readable medium stores instructions to cause the home base station to turn the service transmission power off when no access terminal is parked at a service carrier of the home base station.

In one aspect, the computer readable medium stores instructions to cause the home base station to set the service transmission power to a quiescent power level when all access terminals parked at a service carrier of the home base station are idle.

In one aspect, an apparatus comprises a portable antenna configured to transmit and receive electromagnetic signals, a home base station connected to the portable antenna. The home base station comprises (a) a receiver configured to receive and decode signals from mobile access terminals via the portable antenna in compliance with at least one wireless communication protocol; (b) a transmitter configured to encode and transmit signals to mobile access terminals via the portable antenna in compliance with at least one wireless communication protocol; and (c) a power adjusting process engine for controlling the transmit power of the home base station. The power adjusting process engine is configured to (a) collect signal to interference and noise ratio measurements of at least one access terminal from the receiver; (b) build a histogram for the at least one access terminal based on the signal to interference and noise ratio data received; (c) calculate a probability distribution function for the at least one access terminal based on the histogram; (d) construct a coverage failure probability function by computing a weighted sum of probability distribution functions of all access terminals, and from on the weighted sum computing a coverage failure complementary cumulative distribution function; (e) derive a filtered coverage failure probability by averaging the coverage failure probability function over a period of time; (f) determine whether to adjust the transmission power based on the filtered coverage failure probability; and (g) instruct the transmitter to adjust the transmission power of the home base station.

Other features and advantages of the invention will be apparent from the description and the claims.

DESCRIPTION OF DRAWINGS

FIGS. 2a and 2b illustrate two deployments of home base stations.

DETAILED DESCRIPTION

Figure 1:
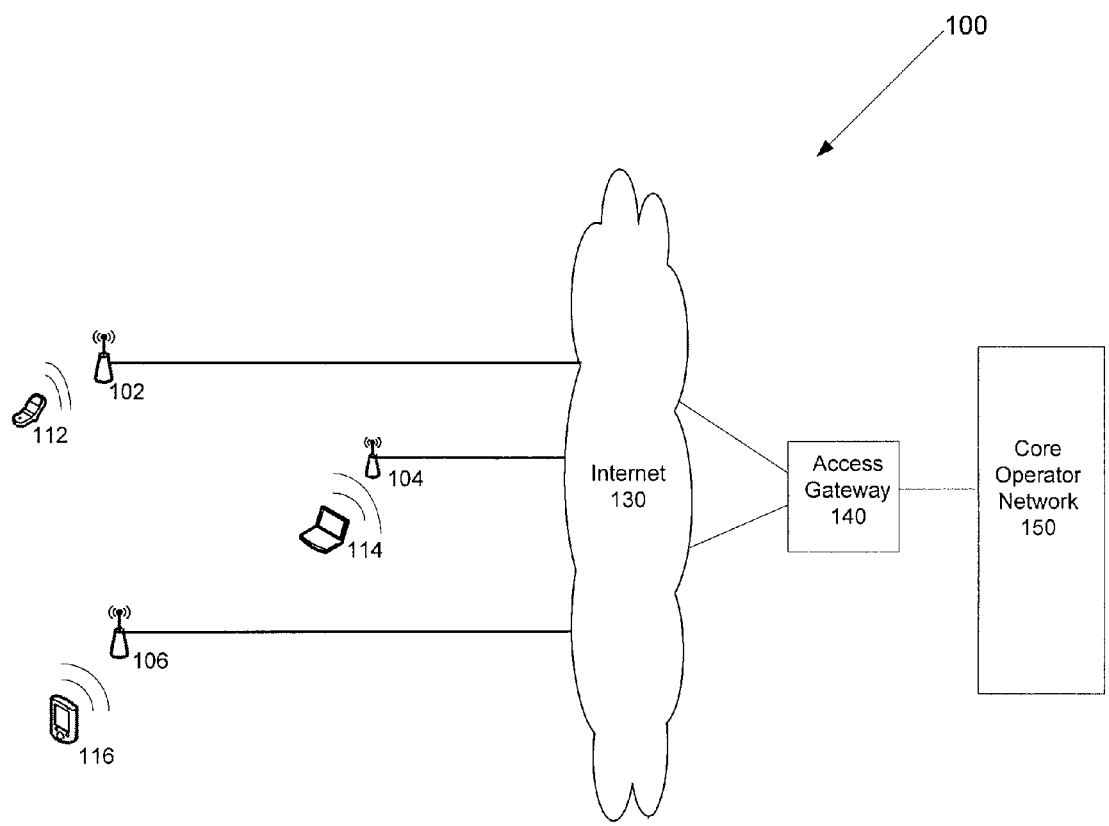
FIG. 1 illustrates a home base station radio network.

Referring to FIG. 1, network 100 includes three deployed home base stations 102, 104, 106. These table-top size base stations may be deployed in locations such as homes and small offices. They are connected to the core wireless network via broadband internet connections. They provide wireless coverage for a small office or a home.

Each of the three home base stations 102, 104, and 106, are illustrated as respectively providing services to access terminals 112, 114, and 116 that are present in the coverage areas of the home base stations. Home base stations 102, 104, and 106 are connected to the Internet 130 through broadband internet connections, such as cable, fiber optics, DSL or other similar methodology or technique. Home base stations may operate at, but are not limited to, the wireless spectrum used in macro cell networks. Home base stations 102, 104, 106 can support both Code Division Multiple Access (CDMA) and Universal Mobile Telecommunications System (UMTS) types of access terminals.

In this implementation, each of the home base stations connect to core operator network 150 through access gateway 140. Access gateway 140 provides high-performance secured connections between the home base stations and the core operator network 150. The core operator network 150 provides wireless services to the access terminals 112, 114, or 116, such as routing telephone calls or data to or from an access terminal.

Transmissions from a home base station to access terminals are forward link transmissions. Transmissions that an access terminal receives from the home base station with which it has registered are signals. Transmissions that an access terminal receives from a home base station with which it is has not registered are interference. The interference an access terminal experiences due to forward link transmissions from other base stations is forward link transmission interference. Forward link signal to interference and noise ratio (SINR) recorded by an access terminal is a metric that can be used to compute the level of interference that is experienced by the said access terminal on the forward link.

There are different types of forward link transmissions, for example, beacon transmissions and service transmissions. Beacon transmissions are used to assist access terminals to rove into to the coverage area of a base station. Through beacon transmissions, when an access terminal moves into the coverage area of the base station with which it has registered, the access terminal is directed to that base station's service frequency, the frequency of service transmissions.

Service transmissions are radio frequency signals used to provide access terminals with wireless communication services. Service transmissions include forward link pilot transmissions, data traffic, and overhead control traffic. Different types of service transmissions are conducted through different channels. Data channels conduct data traffic. Overhead control channels conduct overhead control traffic and carry control information. Pilot channels conduct pilot transmissions. In a 1xRTT and UMTS system, forward link pilot channels and overhead control channels are always operational. In a 1xEV-DO system, the overhead channel, data channel and pilot channel are time division multiplexed.

Forward link pilot transmissions are used for system determination via pseudorandom number (PN) offset and as reference signals for channel estimation.

Radio access networks formed by home base stations are uncontrolled and not planned for optimal radio frequency (RF) signal performance because users may deploy home base stations at any preferred location. If two neighbors each install a home base station in their homes and their homes are within the coverage area of the other's home base station, the transmissions from these two home base stations may interfere with each other. An access terminal in one home may receive transmissions from the base station located in the other home. FIGS. 2a and 2b illustrate two possible deployments 200 and 290 of a pair of home base stations providing wireless services in adjacent residential homes.

FIG. 2a shows a deployment 200 of two home base stations 202 and 204 in two suburban homes 222, 224 that are located at a distance from each other. An access terminal 252 used in home 222 may receive transmissions from both home base stations 202 and 204. Because the distance between homes 222 and 224 is relatively large, the SINR experienced by access terminal 252 may be large.

In comparison, FIG. 2b illustrates a deployment 290 of two home base stations that are deployed in two adjacent town houses 226 and 228. Access terminal 256 that is being used in home 226 may receive transmissions from both home base stations 206 and 208. Because the distance between homes 226 and 228 is relatively small, the interference at access terminal 256 from the transmissions of home base station 208 may be correspondingly strong. Thus access terminal 256 may experience low SINR when both home base stations 206 and 208 are transmitting.

The potential for interference from neighboring home base stations makes it desirable for the home base stations to transmit at the lowest power that the current coverage needs of its users will allow. In this way interference between neighboring home base stations is mitigated and data throughputs are increased. The best transmission power level depends on both the current coverage requirements and the wireless signal environment.

An access terminal is active when there is data traffic between it and its base station. Otherwise, it is idle. When an active or idle access terminal is serviced or supervised by its base station, it is said that the access terminal is parked at the service carrier of the base station. A service carrier on a base station is used to provide wireless communication services. When an access terminal moves out of the coverage area of its base station or is turned off, it is said that the access terminal is not parked at the service carrier of the said base station.

The strength of beacon transmission signals is referred to as beacon power and the strength of service transmission signals is referred to as operating power. Both beacon power and operating power may be adjusted. Transmission power, in this application, refers to either operating power or beacon power. Beacon signals are usually transmitted at the frequency(ies) of the macro network from where access terminals derive service. The service frequency of a home base station may be different from the beacon frequency. In most implementations, the beacon frequency and the service frequency of a home base station are indeed different.

In some implementations, a home base station needs to maintain a minimum forward link SINR to ensure quality of services. The coverage area of a home base station is defined as the area within which the minimum forward link SINR can be achieved. The coverage area of beacon transmissions may be different from the coverage area of service transmissions.

Figure 3:
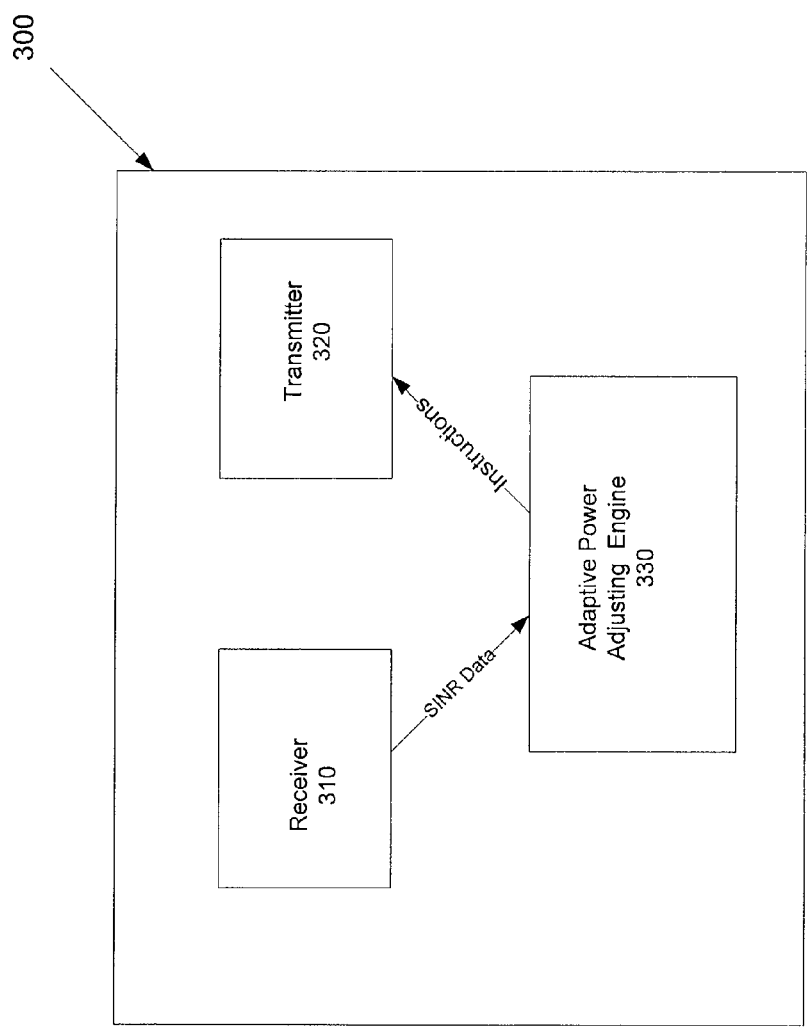
FIG. 3 illustrates interconnections and components of a home base station.

Referring to FIG. 3, an exemplary home base station 300 includes the functional modules related to power adjusting process at home base station 202. Receiver 310 receives SINR data from the access terminals and provides the data to power adjusting engine 330. Power adjusting engine 330 first determines what to do with the base station's transmission powers based on the received SINR data. Then engine 330 sends instructions to transmitter 320 directing transmitter 320 to adjust its transmitting power.

In some implementations, active access terminal 254 (shown in FIG. 2a) records SINRs it detects and sends the SINR data to receiver 310 upon request from home base station 204. In implementations in which the 1xRTT protocol is used, access terminal 254 sends SINRs using a Pilot Strength Measurement Message (PSMM) message. Base station 204 periodically requests PSMM messages from its access terminals. In implementations in which 1xEV-DO protocol is used, access terminal 254 sends SINRs using the Route Update message, both autonomously and in response to requests from the base station. Base station 204 monitors the SINRs reported in the Route Update Message. Base stations that use 1xEV-DO protocol may also map the Data Rate Control (DRC) feedback reported by active access terminals to corresponding SINR values.

For idle access terminals, such as access terminal 252, their forward link SINRs may be determined through periodical paging. Paging is done through periodic messages sent by a home base station requesting information. All registered access terminals that have been idle for more than a period of time, for example every ten minutes, are paged periodically. One concern about periodical paging is that it may cause access terminals to lose its battery power very quickly. However, periodical paging is unlikely to drain access terminals' battery power for three reasons. First, access terminals are often located closely to the base station they have registered with. Second, idle access terminals are often connected to a power source. Third, the anticipated frequency of paging is low.

Receiver 310 forwards the SINR data it receives to power adjusting engine 330 which determines whether to increase, decrease or maintain its transmission powers, i.e., strength of its signals, based on the SINR data. The following discussion focuses on operating power, i.e., the strength of service transmission signals, that is used for service transmissions.

Figure 4:
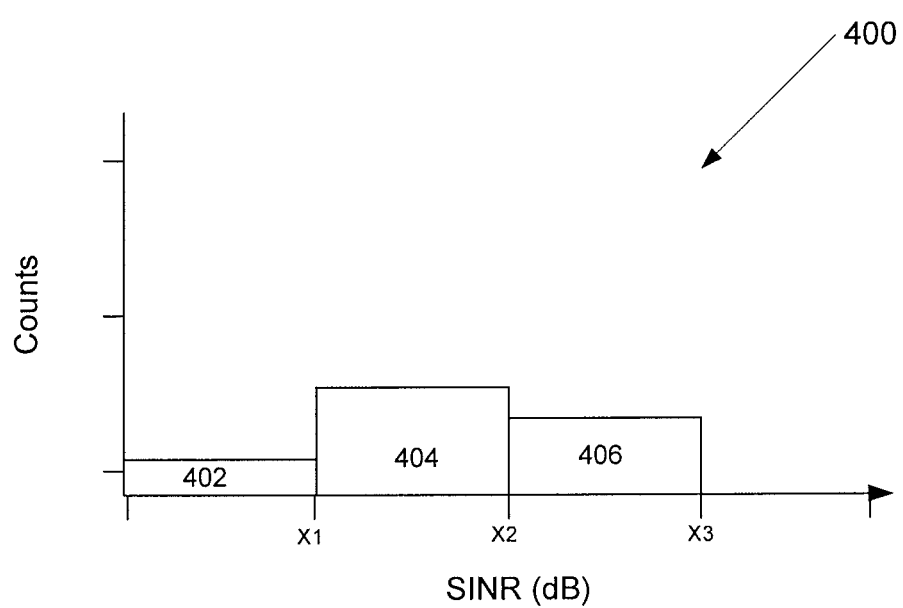
FIG. 4 is a histogram of signal to interference and noise ratio data.

Adaptive power adjusting engine 330 computes a coverage failure probability based on the SINR data received and then compares the coverage failure probability to one or more thresholds. In some implementations, adaptive power adjusting engine 330 constructs a histogram of SINRs for each access terminal based on the SINR data. FIG. 4 shows an example of such a histogram, histogram 400. In histogram 400, the y-axis represents counts of SINR reports received at receiver 310. The x-axis represents SINR values. For a time period of $\Delta t$, bin 402 records how many SINR reports that have an SINR value below X1. Bin 404 records how many SINR reports that have an SINR value between X1 and X2, bin 406 records how many between X2 and X3. A time filter is utilized to slowly filter out old SINR data as new SINR report data come in. As an illustration, X1 is set to be the minimum SINR value that home base station 202 must achieve within its coverage area. Any SINR report from access terminal 252 that has an SINR value below X1 indicates a coverage failure.

Figure 5:
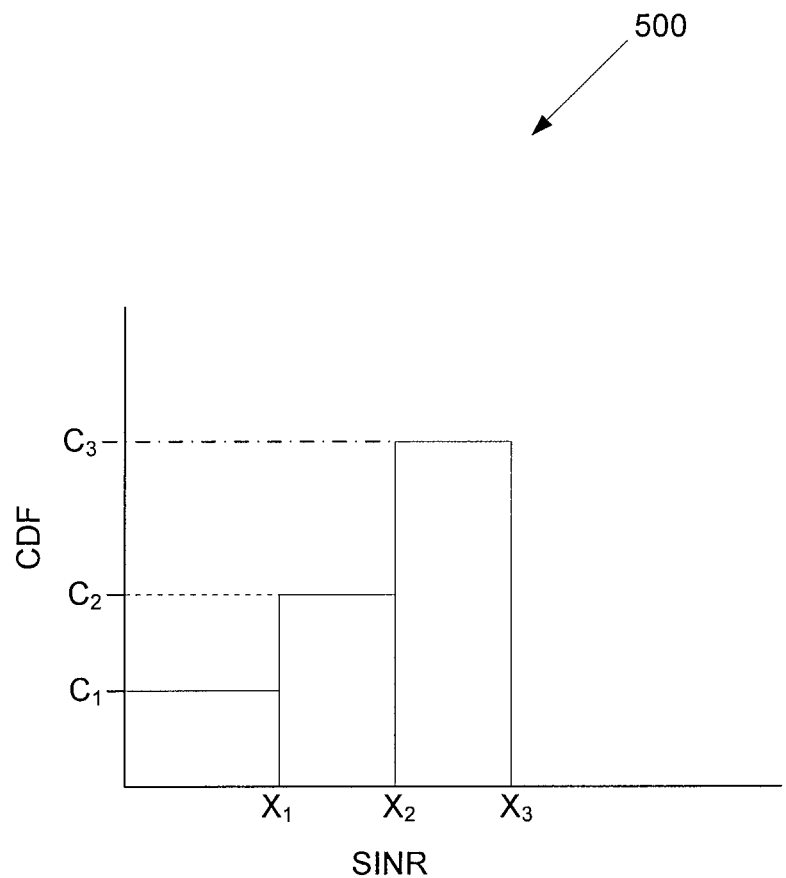
FIG. 5 is a cumulative distribution function.

Referring to FIG. 5, a cumulative distribution function is shown. The y-axis in FIG. 5 represents the values of a cumulative distribution function (CDF). The x-axis represents SINR values. The cumulative distribution function is constructed from the counts recorded in FIG. 4 as following. The number of counts recorded in bins 402, 404, and 406, is divided by the sum total of the number of counts recorded in bins 402, 404, and 406 to give the values of the probability distribution function (PDF) $P_1$, $P_2$, and $P_3$, respectively. The cumulative distribution function (CDF) values, $C_i$, are computed by cumulatively summing the probability distribution function values. For example, $C_1=P_1$, $C_2=C_1+P_2$, and $C_3=C_2+P_3$. The complementary cumulative distribution function (CCDF) $F_1$ is computed using formula:

$$F_i = 1 - C_i; \text{ for discrete SINR value } X_i \qquad (1)$$

A coverage failure probability of home base station 202 (as shown in FIG. 2a) at time to is calculated by forming a weighted sum of the probability distribution functions of typically all of the registered access terminals, active and idle. Weighting factors may include number of registered users, length of activity of a given user and distance of a user from the base station. The complementary cumulative distribution function (CCDF) is constructed from the combined probability distribution function. Let the combined complementary cumulative distribution function be referred to as Coverage Failure Complementary Cumulative Distribution Function (CFCCDF). The coverage failure probability for a given SINR is computed from the CFCCDF by reading the y-axis corresponding to the value of SINR on the x-axis.

In some implementations, a home base station may not update the histogram of an access terminal when receiving a SINR report of that access terminal if the measured round-trip delay of that access terminal indicates that it is outside of a certain distance from the base station. The round-trip delay of an access terminal may be measured with sufficient granularity for this purpose. For example, each home base station may have an advertised coverage area, within which a user may be guaranteed a high data throughput rate, outside which a user may be allowed to operate under moderate data rate. If a home base station is described in the product manual as capable of offering 400 kps downlink inside a home, such high data throughputs may be unavailable in the driveway or beyond, even though moderate data throughputs may be available. When an access terminal is outside the advertised cell radius of the base station, i.e., its round-trip delay indicates that the distance is larger than the advertised cell radius, its complimentary cumulative distribution function may be given less weight because it is acceptable for such an access terminal to experience moderate data rate. This prevents the SINR data reported by the access terminals that are outside the advertised coverage area from biasing the weighting in the calculation of the coverage failure probability.

As a comparison, an access terminal which is located closely to a base station, but is separated from the base station by a wall, is guaranteed a certain high data rate. Its complimentary cumulative distribution function may be given more weight than that of an access terminal located outside the advertised coverage area.

The filtered coverage failure probability is derived by averaging the coverage failure probability for each time period $\Delta t_i$ over a long period, such as, many hours/days, to eliminate transient conditions and to capture true coverage conditions. As mentioned above, this is accomplished by a time filter.

At power update intervals, for example once every 5 minutes, home base station 202 examines the filtered coverage failure probability and adjusts its power upward or downward, by specific ratios in order to maintain desired coverage. When the filtered coverage failure probability indicates that there is a need to increase the operating power of the base station, either because the average signal strength experienced by its access terminals is weak or the average interference experienced by its access terminals is strong, base station 202 will increase its operating power. On the other hand, when the filtered coverage failure probability indicates that the operating power can be reduced, either because the average signal strength experienced by access terminals is strong or the average interference experienced by access terminals is weak, home base station 202 will reduce its operating power.

However, the operating power of home base station 202 is confined between a ceiling (maximum power level) and a floor (minimum power level). These two parameters may be configured by a network operator based on the size of the desired coverage area and radio frequency characteristics of the operating environment of the base station.

In FIG. 2a, access terminal 252 registered with home base station 202 may experience little or no interference. The operating power of home base station 202 may be reduced if high SINR values reported by access terminal 252 indicates that the operating power is stronger than what is needed. The power level of home base station 202 may be reduced, but not below the minimum power level.

The maximum power level may be used to control a positive feedback loop. For example, in FIG. 2b, home base stations 206 and 208 are located relatively close to each other. Access terminal 256 registered with home base station 206 experiences strong interference due to home base station 208. The filtered coverage failure probability measured by home base station 206 may dictate home base station 208 to increase its operating power. Similarly, home base station 208 may increase its operating power. As both home base stations 206 and 208 increase their operating powers, access terminals in both houses will detect stronger interference, which will cause both base stations to increase their operating powers even more. The maximum power level defines the maximum operating power that a home base station can set to prevent a runaway positive feedback loop.

Figure 6:
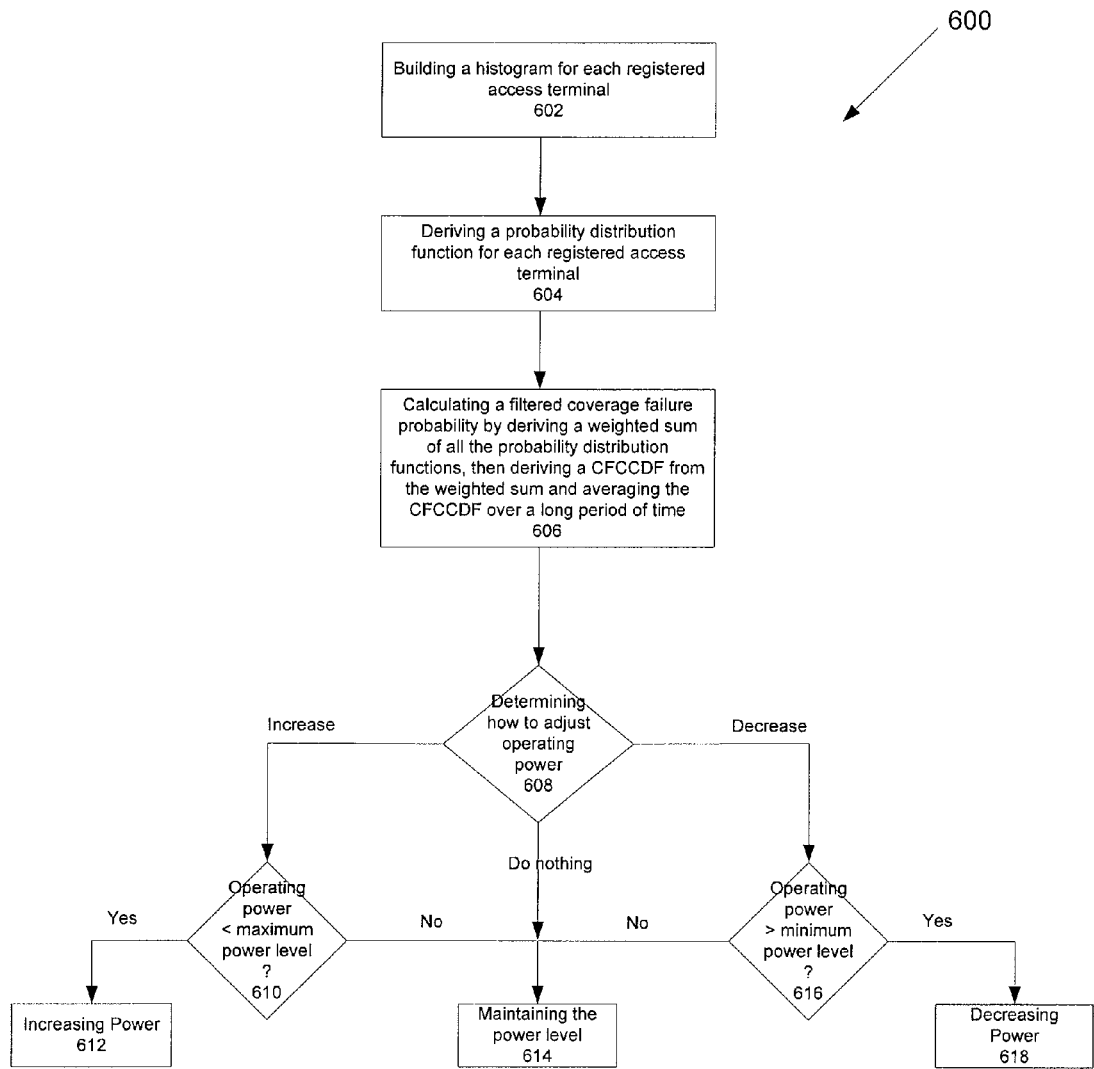
FIG. 6 is a flow chart of a power adjusting process of a home base station.

FIG. 6 is a flow chart of adaptive power adjusting engine 330 at home base station 202. In step 602, home base station 202 builds a histogram for each registered access terminal based on the access terminal's SINR data sent from receiver 310. Home base station 202 then derives a probability distribution function for each registered access terminal in step 604. From the probability distribution functions, power adjusting engine 330 calculates the filtered coverage failure probability by computing a weighted sum of the probability distribution functions of all registered access terminals first, then deriving the Coverage Failure Complementary Cumulative Distribution Function (CFCCDF) from the weighted sum and averaging the CFCCDF over a long period of time in step 606. In step 608, power adjusting engine 330 decides what to do with the operating power. For example, the filtered coverage failure probability may be compared to an upper threshold. If the filtered coverage failure probability exceeds the threshold, power adjusting engine 330 may decide that the operating power needs to be increased. The filtered coverage failure probability may also be compared to a lower threshold. If the filtered coverage failure probability is below the lower threshold, power adjusting engine 330 may decide that the operating power can be decreased. If the filtered coverage failure probability is within the desired range, power adjusting engine 330 may decide that nothing is needed to be done.

If power adjusting engine 330 determines that the operating power needs to be increased, in step 610, it then compares the current operating power with the maximum power level. If the current operating power is lower than the maximum power level, the current operating power may be increased in step 612. Otherwise, the current operating power level is maintained at the same level in step 614.

If adaptive power adjusting engine 330 determines that the operating power may be decreased, in step 616, the engine compares the current operating power with the minimum power level. If the current operating power is higher than the minimum power level, the current operating power may be decreased in step 618. Otherwise, the current operating power level is maintained at the same level in step 614.

Figure 7:
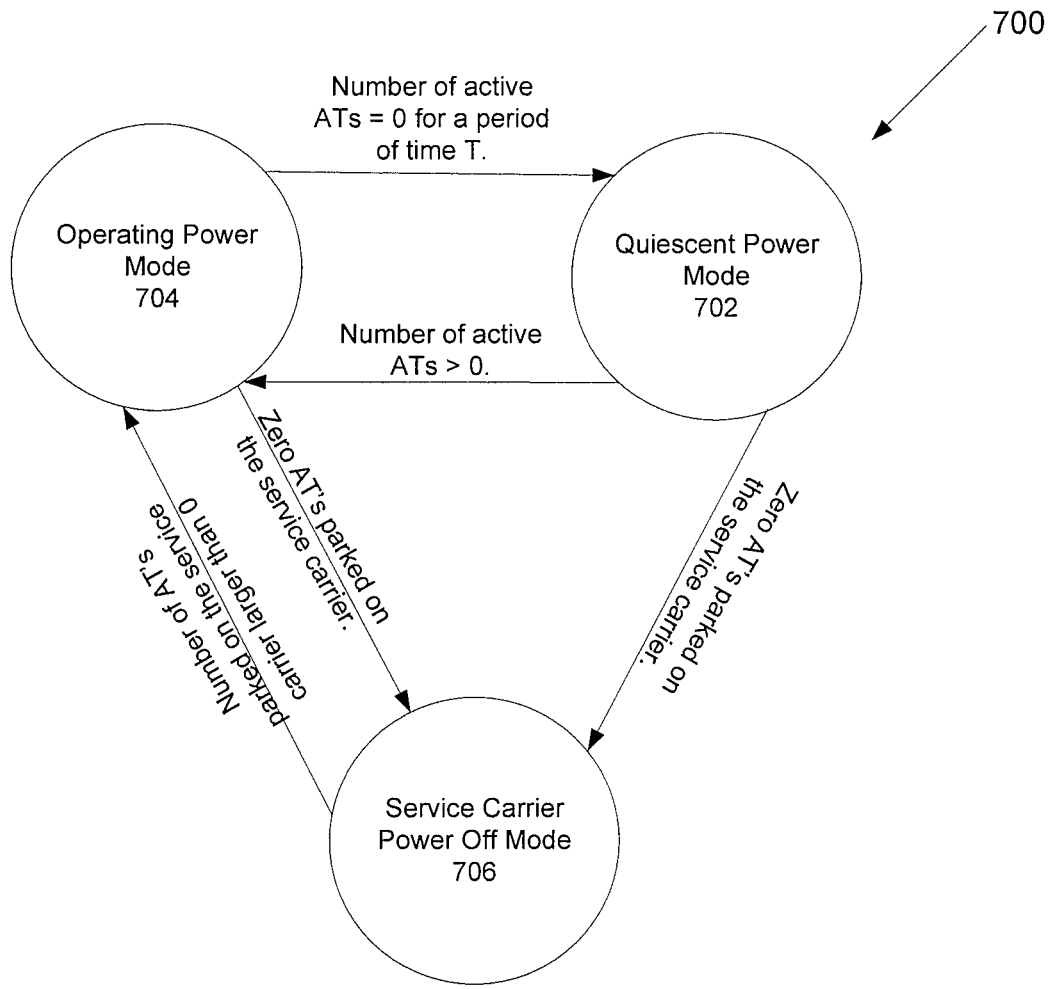
FIG. 7 is a diagram illustrating three modes of a home base station.

FIG. 6 illustrates the states of the home base station 202 for adaptively adjusting its operating power when there are active access terminals. When there are no active access terminals for a period of time, home base station 202 will switch into a quiescent power mode. Referring to FIG. 7, in quiescent power mode 702, the operating power of base station 202 is reduced to a quiescent power level because data traffic channels are not active. The operating power is not turned off, but rather maintained at the quiescent power level so that all of the overhead control channels will be decoded correctly even at the edge of the coverage area.

As mentioned above, in a 1xRTT system, overhead control channels are always operational, even in a quiescent power mode. The pilot transmissions are used as reference signals for channel estimation. The higher the transmission power, the higher the accuracy of channel estimation. The desired accuracy of channel estimation increases with data throughput rates. Typically, overhead control channels have low data throughput rates and the desired accuracy in channel estimation for overhead control channels are relatively low. Thus, overhead control channels require lesser pilot transmission power for acceptable channel estimation than channels with higher data throughput rates. Therefore, when a home base station has no active connection for a period of time and is only engaging in overhead control channel transmissions, the transmission power may be reduced to the quiescent power level without affecting the accuracy of channel estimation associated with overhead control traffic.

In some implementations, the quiescent power level may be related to the current operating power level as following:

$$Quiescent\_Power = Scaling\_Factor * Current\ operating\ power * R1 + Fixed\_Bias.$$

Scaling_Factor and Fixed_Bias are certain constants. R1 is a parameter that is the ratio of the signal power required to achieve a certain error rate for transmissions at the data rate of the control channels to the signal power required to achieve a certain error rate for transmissions at the average minimum forward link data rate guaranteed by the base station at the edge of the coverage area.

The benefits of implementing a quiescent power mode may include reducing forward link pilot to forward link pilot interference and improving data throughput of neighboring home base stations. For example, when a home base station operates in a quiescent mode, forward link pilot transmission of this base station will interfere less with a neighboring base station's forward link transmission. As a result, neighboring access terminals will report higher SINR values. Wireless systems such as 1xEV-DO use pilot SINR values measured at access terminals to choose forward link data throughput rates. The higher the SINR, the greater the data throughput rate chosen. Therefore one home base station going into a quiescent mode allows its neighboring home base stations to choose higher data throughput rates. Neighboring access terminals also benefit from throughput improvement as a result of less interference from the reduced power of overhead channel transmissions of the idle base station.

When the home base station 202 is in a quiescent mode and the number of active access terminals at home base station 202 becomes more than zero, the operating power of the base station is ramped up to the normal operating power level in order to support the data traffic. This is illustrated in the state diagram 700 by a transition into operating power mode 704.

FIG. 7 shows how home base station 202 switches between operating power mode 704, quiescent power mode 702, and service carrier power off mode 706

If home base station 202 is in operating power mode 704, at least one access terminal is active, i.e., engaging in data traffic. When all access terminals become idle for a period of time, the base station switches into quiescent power mode 702. When all access terminals move out of the coverage area of the base station, the base station switches into service carrier power off mode 706.

If home base station 202 is in quiescent power mode 702, all access terminals may be idle. When one of the access terminals becomes active, the base station switches into operating power mode 704. When all idle access terminals move out of the coverage area of the base station, the base station switches into service carrier power off mode 706.

If home base station 202 is in service carrier power off mode 706, all access terminals are outside of the coverage area of the base station. When at least one access terminal moves into the coverage area of the base station, the base station switches into operating power mode 704.

In some implementations, home base station 202 determines whether to switch out of service carrier power off mode 706 using a service redirection message. When an access terminal moves into the home area, i.e., the coverage area of the base station with which it has registered, the access terminal decodes the forward link beacon signals of the said base station. On the beacon frequency, the access terminal receives a service redirection message from the base station, commanding the access terminal to shift to the service frequency of the home base station. The access terminal decodes the service redirection message and sends an acknowledgement back to the base station. When the base station receives the acknowledgement, it will transition from power off mode 706 to operating power mode 704 in anticipation of providing service to the access terminal.

The above described techniques and methodologies used to adaptively adjust home base station operating power are applicable to beacon power. Adaptively adjusting the beacon power of a home base station is further needed to avoid attracting unwanted access terminals.

In some implementations, a home base station adjusts its beacon power based on the SINR data reported by access terminals. An access terminal may report SINR data related to its service channels and beacon channels jointly. Using the beacon channel SINR data, the base station's beacon power may be adjusted using the same mechanism as the base station's operating power is adjusted.

In some implementations, a home base station may infer beacon channel SINR data using the service channel SINR data. A home base station constructs a rove-in coverage histogram based on the first one or few SINR data reports from an access terminal when it first moves into the coverage area of the base station. By comparing the filtered rove-in coverage histograms with the filtered coverage histograms, the home base station can decide whether the beacon power needs to be adjusted. For example, assuming the coverage areas of beacon transmissions and service transmissions are the same, if a majority of the filtered rove-in coverage histograms show higher SINR values than a majority of the filtered coverage histograms, this may indicate that the access terminals are roving into the base station at an average distance closer to the base station than where the access terminals generally operate after roving in. By comparing the two histograms, the base station may be able to determine the direction in which the beacon power can be moved.

Often by planning, the coverage areas of beacon transmissions and service transmissions are different. Beacon coverage may be smaller than service coverage. The difference in the coverage areas can be accounted for by a fixed offset (e.g., provided in decibels (dB)) in the coverage histograms in the above described method.

Although this description may employ terminology of a particular standardized protocol, such as 1xEV-DO air interface protocol, the principles and techniques are equally applicable to the CDMA and non-CDMA air interface protocols.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The above are examples for illustration only and not to limit the alternatives in any way. The techniques described herein can be performed in a different order and still achieve desirable results. The techniques can be used in any interference limited multi-user communication system.

What is claimed is:

1. A method comprising:
    receiving, at a home base station, signal to interference and noise ratio (SINR) data from at least one access terminal;
    calculating a coverage failure probability based at least in part on the SINR data, the calculating comprising:
        determining that the at least one access terminal is located within a threshold distance of the home base station,
        building a histogram associated with the at least one access terminal based on the received SINR data,
        calculating a probability distribution function for the at least one access terminal based upon the histogram;
        calculating the coverage failure probability function by computing a weighted sum of probability distribution functions;
        calculating a coverage failure complementary cumulative distribution function based upon the weighted sum; and
        averaging the coverage failure probability function over a period of time to produce the coverage failure probability;
    determining to adjust a transmission power of the home base station based at least in part on the coverage failure probability; and
    adaptively adjusting the transmission power of the home base station based at least in part on the coverage failure probability including:
        setting the transmission power to a quiescent power level in response to determining that there is no active connection on the home base station.

2. The method of claim 1, wherein the transmission power is beacon transmission power.

3. The method of claim 1, wherein the transmission power is service transmission power.

4. The method of claim 3, wherein the service transmission power is turned off when no access terminal of the home base station is serviced by a service carrier of the home base station.

5. The method of claim 3, further comprising:
increasing the service transmission power from the quiescent power level when at least one access terminal becomes active.

6. The method of claim 3, wherein the service transmission power is set between a maximum power level and a minimum power level when the at least one access terminal is active.

7. The method of claim 1, wherein the transmission power is a service transmission power.

8. The method of claim 7, wherein the service transmission power is reduced.

9. The method of claim 7, wherein the service transmission power is increased.

10. The method of claim 1, wherein the transmission power is a beacon transmission power.

11. The method of claim 10, wherein the SINR ratio data is associated with the beacon transmission power and is sent in along with the signal to interference and noise ratio data associated with the service transmission power.

12. The method of claim 10, wherein the SINR data is related to the service transmission power, SINR data related to the beacon transmission power are derived from a first report of the SINR data related to the service transmission power when the at least one access terminal enters a coverage area of the home base station.

13. The method of claim 10, wherein the SINR ratio data are related to the service transmission power, and SINR data related to the beacon transmission power is derived from at least one report of the SINR data related to the service transmission power when the at least one access terminal enters a coverage area of the home base station.

14. The method of claim 1, wherein the weighted sum is equal among access terminals.

15. The method of claim 1, wherein the weighted sum depends on profiles of access terminals.

16. The method of claim 1, wherein the weighted sum depends upon at least one access terminal activity.

17. The method of claim 1, wherein the weighted sum depends on distances between the home base station and access terminals.

18. The method of claim 17, wherein a probability distribution function of an access terminal located outside a coverage area of the home base station is discounted.

19. The method of claim 1, calculating a coverage failure probability based at least in part on the SINR data further comprises excluding from the coverage failure probability an SINR measurement from an access terminal that is located outside the threshold distance from the home base station.

20. An apparatus comprising:
a home base station configured to:
receive signal to interference and noise ratio (SINR) data from at least one access terminal;
calculate a coverage failure probability based at least in part on the SINR data, the calculating comprising:
determining that the at least one access terminal is located within a threshold distance of the home base station,
building a histogram associated with the at least one access terminal based on the received SINR data,
calculating a probability distribution function for the at least one access terminal based upon the histogram;
calculating the coverage failure probability function by computing a weighted sum of probability distribution functions;
calculating a coverage failure complementary cumulative distribution function based upon the weighted sum; and
averaging the coverage failure probability function over a period of time to produce the coverage failure probability;
determine that a transmission power of the home base station should be adjusted based at least in part on the coverage failure probability; and
adaptively adjust the transmission power of the home base station based at least in part on the coverage failure probability including:
setting the transmission power to a quiescent power level in response to determining that there is no active connection on the home base station.

21. The apparatus of claim 20, wherein the transmission power is a service transmission power.

22. The apparatus of claim 20, wherein the transmission power is a beacon transmission power.

23. The apparatus of claim 21, wherein the home base station is further configured to operate in at least one of a normal operating mode and a quiescent power mode, with the home base station operating at a normal operating power level during the normal operating mode and at a quiescent power level during the quiescent power mode, and the transitioning between the normal operating mode and the quiescent power mode being dependent upon the status of at least one access terminal.

24. The apparatus of claim 23, wherein the home base station is further configured to operate in:
a service carrier power off mode in which service transmission power is turned off and initiation of the service carrier power off mode is dependent upon the status of at least one access terminal.

25. The apparatus of claim 24, wherein the home base station switches out of the service carrier power off mode when at least one access terminal acknowledges a service redirection message sent from the home base station.

26. The apparatus of claim 24, wherein the home base station switches into the service carrier power off mode when no access terminal is serviced by the home base station.

27. The computer storage device of claim 20 in which the instructions cause the home base station to turn the service transmission power off when no access terminal is parked at a service carrier of the home base station.

28. One or more computer storage devices storing instructions that, when executed, cause a home base station to:
Receive signal to interference and noise ratio (SINR) data from at least one access terminal;
calculate a coverage failure probability based at least in part on the SINR data, the calculating comprising:
determining that the at least one access terminal is located within a threshold distance of the home base station,
building a histogram associated with the at least one access terminal based on the received SINR data, and
calculating a probability distribution function for the at least one access terminal based on the histogram;
constructing the coverage failure probability function by computing a weighted sum of probability distribution functions of all access terminals, and from the weighted sum computing a coverage failure complementary cumulative distribution function; and deriving the coverage failure probability by averaging the coverage failure probability function over a period of time;

determine that a transmission power of the home base station should be adjusted based at least in part on the coverage failure probability; and adaptively adjust the transmission power of the home base station based at least in part on the calculated coverage failure probability including:

setting the transmission power to a quiescent power level in response to determining that there is no active connection on the home base station.

29. The computer storage device of claim 28, wherein the transmission power is beacon transmission power.

30. The computer storage device of claim 28, wherein the transmission power is service transmission power.

31. The computer storage device of claim 30 in which the instructions cause the home base station to set the service transmission power to a quiescent power level when all access terminals parked at a service carrier of the home base station are idle.

32. An apparatus comprising:

a portable antenna configured to transmit and receive electromagnetic signals;

a home base station connected to the portable antenna and comprising:

a receiver configured to receive and decode signals from mobile access terminals via the portable antenna in compliance with at least one wireless communication protocol;

a transmitter configured to encode and transmit signals to mobile access terminals via the portable antenna in compliance with at least one wireless communication protocol; and a power adjusting engine for controlling the transmit power of the home base station, wherein the power adjusting process engine is configured to:

collect signal to interference and noise ratio (SINR) measurements of at least one access terminal from the receiver;

build a histogram for the at least one access terminal based on the SINR data received;

calculate a probability distribution function for the at least one access terminal based on the histogram;

construct a coverage failure probability function by computing a weighted sum of probability distribution functions of all access terminals, and from the weighted sum computing a coverage failure complementary cumulative distribution function;

derive a filtered coverage failure probability by averaging the coverage failure probability function over a period of time;

determine whether to adjust the transmission power based on the filtered coverage failure probability; and instruct the transmitter to adjust the transmission power of the home base station.

\* \* \* \* \*

UNITED STATES PATENT AND TRADEMARK OFFICE
CERTIFICATE OF CORRECTION

PATENT NO. : 8,909,278 B2
APPLICATION NO. : 11/963574
DATED : December 9, 2014
INVENTOR(S) : Prashanth Rao et al.

It is certified that error appears in the above-identified patent and that said Letters Patent is hereby corrected as shown below:

In the Claims,

Column 14, Line 52, In Claim 28, delete "Receive" and insert -- receive --, therefor.

Column 14, Line 60, In Claim 28, after "data", delete "and".

Signed and Sealed this
Twenty-fourth Day of March, 2015

Michelle K. Lee
*Director of the United States Patent and Trademark Office*